US 8,755,630 B2

(12) United States Patent
Hwang et al.

(10) Patent No.: US 8,755,630 B2
(45) Date of Patent: Jun. 17, 2014

(54) OBJECT POSE RECOGNITION APPARATUS AND OBJECT POSE RECOGNITION METHOD USING THE SAME

(75) Inventors: Hyo Seok Hwang, Seoul (KR); Kyung Shik Roh, Seongnam-si (KR); Suk June Yoon, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 237 days.

(21) Appl. No.: 13/218,859

(22) Filed: Aug. 26, 2011

(65) Prior Publication Data
US 2012/0114175 A1 May 10, 2012

(30) Foreign Application Priority Data

Nov. 5, 2010 (KR) .................. 10-2010-0109969

(51) Int. Cl.
*G06K 9/36* (2006.01)
(52) U.S. Cl.
USPC .......................................................... 382/276
(58) Field of Classification Search
USPC .......................................................... 382/103
See application file for complete search history.

(56) References Cited

U.S. PATENT DOCUMENTS

| | | | | |
|---|---|---|---|---|
| 6,580,821 B1* | 6/2003 | Roy | .............................. | 382/154 |
| 6,608,913 B1* | 8/2003 | Hinton et al. | ................. | 382/104 |
| 6,816,629 B2* | 11/2004 | Redlich | ......................... | 382/285 |
| 7,003,136 B1* | 2/2006 | Harville | ......................... | 382/103 |
| 7,187,809 B2* | 3/2007 | Zhao et al. | ..................... | 382/285 |
| 7,471,821 B2* | 12/2008 | Rubbert et al. | ............... | 382/154 |
| 8,213,706 B2* | 7/2012 | Krishnaswamy et al. | ..... | 382/154 |
| 8,542,252 B2* | 9/2013 | Perez et al. | ..................... | 345/649 |
| 2005/0148859 A1* | 7/2005 | Miga et al. | ..................... | 600/410 |
| 2007/0031064 A1* | 2/2007 | Zhao et al. | ..................... | 382/285 |
| 2008/0310757 A1* | 12/2008 | Wolberg et al. | ............... | 382/285 |
| 2009/0167764 A1* | 7/2009 | Ohtsuki | ......................... | 345/427 |
| 2009/0245690 A1* | 10/2009 | Li et al. | ......................... | 382/285 |
| 2010/0166294 A1* | 7/2010 | Marrion et al. | ............... | 382/154 |
| 2010/0207936 A1* | 8/2010 | Minear et al. | ................. | 345/419 |
| 2010/0259626 A1* | 10/2010 | Savidge | ........................ | 348/208.4 |
| 2011/0043613 A1* | 2/2011 | Rohaly et al. | ................... | 348/50 |
| 2011/0123122 A1* | 5/2011 | Agrawal et al. | ............... | 382/203 |
| 2011/0176007 A1* | 7/2011 | Ding et al. | ..................... | 348/189 |

FOREIGN PATENT DOCUMENTS

KR 10-0920931 5/2009

* cited by examiner

*Primary Examiner* — Michelle Entezari
(74) *Attorney, Agent, or Firm* — Staas & Halsey LLP (57) ABSTRACT

An object pose recognition apparatus and method. The object pose recognition method includes acquiring first image data of an object to be recognized and 3-dimensional (3D) point cloud data of the first image data, and storing the first image data and the 3D point cloud data in a database, receiving input image data of the object photographed by a camera, extracting feature points from the stored first image data and the input image data, matching the stored 3D point cloud data and the input image data based on the extracted feature points and calculating a pose of the photographed object, and shifting the 3D point cloud data based on the calculated pose of the object, restoring second image data based on the shifted 3D point cloud data, and re-calculating the pose of the object using the restored second image data and the input image data.

15 Claims, 8 Drawing Sheets

OBJECT POSE RECOGNITION APPARATUS AND OBJECT POSE RECOGNITION METHOD USING THE SAME

CROSS-REFERENCE TO RELATED APPLICATIONS

This application claims the benefit of Korean Patent Application No. 2010-0109969, filed on Nov. 5, 2010 in the Korean Intellectual Property Office, the disclosure of which is incorporated herein by reference.

BACKGROUND

1. Field

Embodiments relate to an object pose recognition apparatus and an object pose recognition method using the same, and more particularly, to an object pose recognition apparatus to recognize the pose of an object from image data of the object input via a camera, and an object pose recognition method using the same.

2. Description of the Related Art

Generally, object recognition in a conventional computer vision field has been developed into a scheme to recognize objects registered through a feature extraction algorithm and a recognizer and then to determine if the registered objects are not present in incoming images, after constructing database of objects to be recognized and registering the objects through learning processes.

Since the use of a 3-dimensional (3D) Computer Aided Design (CAD) model during the construction of database of objects requires human input, practical application thereof to robot services is not possible. Recently, although a method to automatically extract and register the features of objects has been developed, limitations are still present in terms of robustness against environmental variations.

Environmental variation, with respect to object recognition, may be divided into a photometric invariance generated due to illumination variation or noise and a geometric invariance related to variation in the angle of a camera or the distance from an object. Invariance is important because, for robot services, users have no choice but to register objects having different types and features used in their homes in aspects of privacy protection. That is, it is impractical that engineers obtain a desired object list from users and resister objects. Since it is cumbersome to collect many images corresponding to variations of each of objects to learn objects, coping with many variations of an object and maintaining stable object recognition through one-time object registration are very important.

However, a conventional object pose recognition apparatus exhibits limited robustness against various environmental variations.

SUMMARY

Therefore, it is an aspect of an embodiment to provide an object pose recognition apparatus to shift previously stored 3D point cloud data of an object based on the pose of the object calculated by feature points and recalculate the pose of the object using image data restored through the shifted 3D point cloud data, and an object pose recognition method using the same.

Additional aspects of embodiments will be set forth in part in the description which follows and, in part, will be obvious from the description, or may be learned by practice of embodiments.

In accordance with an aspect of an embodiment, an object pose recognition method includes acquiring first image data of an object to be recognized and 3-dimensional (3D) point cloud data of the first image data, and storing the first image data and the 3D point cloud data in a database, receiving input image data of the object photographed by a camera, extracting feature points from the stored first image data and the input image data, matching the stored 3D point cloud data and the input image data based on the extracted feature points and calculating a pose of the photographed object, and shifting the 3D point cloud data based on the calculated pose of the object, restoring second image data based on the shifted 3D point cloud data, and re-calculating the pose of the object using the restored second image data and the input image data.

The re-calculation of the pose of the object may be repeated until the calculated pose of the object satisfies a preset convergence condition.

The re-calculation of the pose of the object may include extracting feature points from the restored second image data and the input image data, and matching the shifted 3D point cloud data and the input image data based on the extracted feature points and re-calculating the pose of the object.

The object pose recognition method may further include determining whether an unrestored pixel is present in the second image data, and if the unrestored pixel is present, restoring the unrestored pixel using the shifted 3D point cloud data.

The determination may include, if a pixel has reference brightness, checking brightness of a plurality of pixels adjacent to the pixel, and if the number of pixels having brightness exceeding the reference brightness is above a preset number, determining that the pixel is an unrestored pixel.

The unrestored pixel may be restored by setting brightness of the unrestored pixel to a brightness value of a 3D point nearest the unrestored pixel from 3D point cloud data of the second image data.

The 3D point nearest the unrestored pixel may be a point nearest a straight line between a principal point of the camera and the unrestored pixel.

The calculation of the pose of the object may include calculating a rotation vector which is rotation information of the object and a translation vector which is location information of the object.

In accordance with another aspect of an embodiment, an object pose recognition apparatus includes a database to acquire first image data of an object to be recognized and 3-dimensional (3D) point cloud data of the first image data, and store the first image data and the 3D point cloud data, a receiver to receive input image data of the object photographed by a camera, a feature point processor to extract feature points from the stored first image data and the input image data and match the extracted feature points, and a pose calculator to calculate a pose of the photographed object based on the feature points matched through the feature point processor, wherein the object pose recognition apparatus further includes an image data restorer to shift the stored 3D point cloud data based on the calculated pose of the object and restore second image data based on the shifted 3D point cloud data, and wherein the pose calculator recalculates the pose of the object using the second image data restored by the image data restorer and the input image data.

The image data restorer may determine whether the pose of the object calculated by the pose calculator satisfies a preset convergence condition, and the pose calculator may repeat the re-calculation of the pose of the object until the pose of the object calculated by the pose calculator satisfies the convergence condition.

The feature point processor may extract feature points from the second image data and the input image data and match the extracted feature points.

The image data restorer may determine whether an unrestored pixel is present in the second image data, and if the unrestored pixel is present, restore the unrestored pixel using the shifted 3D point cloud data.

If a pixel has reference brightness, the image data restorer may check brightness of a plurality of pixels adjacent to the pixel, and determine that the unrestored pixel is present if the number of pixels having brightness exceeding the reference brightness is above a preset number.

The image data restorer may extract a point nearest the unrestored pixel from 3D point cloud data of the second image data if the unrestored pixel is present, and restore the unrestored pixel by setting brightness of the unrestored pixel to a brightness value of the extracted 3D point.

The image data restorer may extract a 3D point nearest a straight line between a principal point of the camera and the unrestored pixel as the point nearest the unrestored pixel.

The pose calculator may calculate a rotation vector which is rotation information of the object and a translation vector which is location information of the object.

BRIEF DESCRIPTION OF THE DRAWINGS

These and/or other aspects of embodiments will become apparent and more readily appreciated from the following description of the embodiments, taken in conjunction with the accompanying drawings of which.

DETAILED DESCRIPTION

Reference will now be made in detail to embodiments, examples of which are illustrated in the accompanying drawings, wherein like reference numerals refer to like elements throughout.

Figure 1:
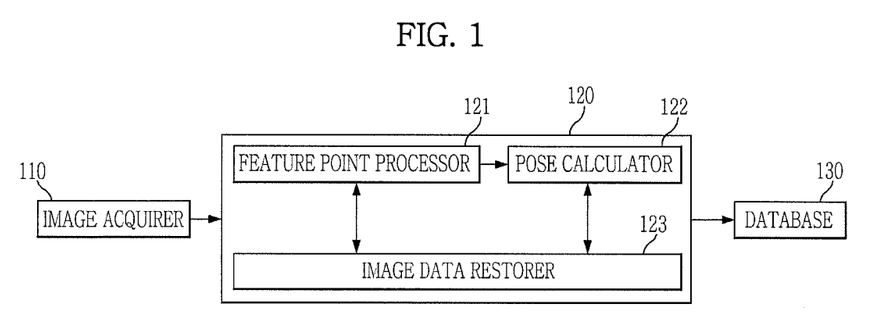
FIG. 1 is a schematic block diagram of an object pose recognition apparatus according to an embodiment.

FIG. 1 is a schematic block diagram of an object pose recognition apparatus according to an embodiment.

The object pose recognition apparatus includes an image acquirer 110, a controller 120, and a database 130.

The image acquirer 110 acquires an image photographed by a camera installed in a movable object. The movable object may include a device with a photographing function, such as a robot or a cellular phone. The camera may be a 3D measuring device, for example, a stereoscopic camera or a Time-Of-Flight (TOF) camera to photograph images on a moving path of a moving object and acquire in real time 3D information of various objects located on the moving path.

The controller 120 controls the overall operation of the object pose recognition apparatus and includes a feature point processor 121, a pose calculator 122, and an image data restorer 123.

The feature point processor 121 extracts feature points from input image data acquired through the image acquirer 110 and image data of objects stored in the database 130 and matches the extracted feature points.

Meanwhile, Scale Invariant Feature Transform (SIFT) and Speeded Up Robust Feature (SURF) are used to extract and match the feature points.

The above two methods have invariance in common relative to scale variation and rotation because they use a scale space to extract a feature vector. The scale space refers to a place where images are scaled to various sizes. In the scale space, since both an acquired image of a large size and an acquired image of a small size are considered, a feature vector which is invariant to scale variation may be obtained, A Gaussian kernel is used to obtain reduced-scale images. When performing convolution of an image, an effect to produce a small image may be obtained as a variance of the Gaussian kernel is increased. In SIFT, if a variance is increased to some degree, the size of an original image is reduced and then convolution with the Gaussian kernel is performed. Next, a Difference of Gaussian (DoG) between adjacent images is calculated. A local extrema of the DoG in the scale space is selected as a feature point and a feature vector. That is, SIFT calculates the Laplacian and searches for the local extrema while changing a variance. In SURF, an extraction process of a feature vector is simplified to overcome the disadvantageously time consuming calculation processes of SIFT.

In this embodiment, the feature point processor 121 extracts and matches feature points based on the SURF method.

The pose calculator 122 estimates pose information of an object using a three-point algorithm and a random sample consensus (RANSAC). This estimation process involves converting input image data of an image coordinate system into input image data of a space coordinate system.

The pose calculator 122 detects to what extent the pose of an object to be recognized in a current space is varied based on a reference pose of image data stored in the database 130, from the input image data in the space coordinate system and 3D point cloud data stored in the database 130. The detected pose information of the object is transmitted to the image data restorer 123.

Namely, the pose calculator 122 calculates a rotation vector and a translation vector which are pose information of an object. It may be recognized through the rotation vector and the translation vector to what extent the pose of an object in a current space is varied based on a reference pose stored in the database 130. That is, rotation and motion variations may be recognized.

Further, the pose calculator 122 recalculates the pose of an object using restored image data transmitted by the image data restorer 123 and input image data.

The image data restorer 123 shifts the 3D point cloud data using the rotation vector and the translation vector calculated by the pose calculator 122 and restores image data using the shifted 3D point cloud data.

Specifically, the image data restorer 123 projects the shifted 3D point cloud data onto a normalized plane to generate image data and determines whether pixels which are not restored are present within the generated image data to restore the unrestored pixels.

Further, the image data restorer 123 determines whether a preset convergence condition is satisfied based on the pose information of an object transmitted by the pose calculator 122. If the convergence condition is not satisfied, the image data restorer 123 restores image data and transmits the restored image data to the pose calculator 122 so that the pose calculator 122 may recalculate the pose of an object.

The database 130 acquires and stores image data of an object and 3D point cloud data.

Figure 2:
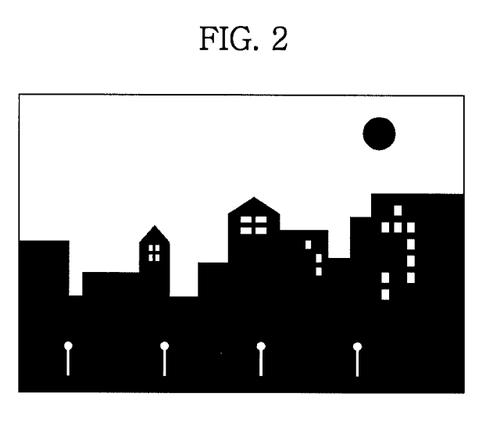
FIG. 2 is a diagram illustrating an example of image data of a recognized object stored in the database shown in FIG. 1.

Specifically, the database 130 stores any one of image data obtained by photographing an object from the left and right sides and a disparity map. An example of image data stored in the database 130 is shown in FIG. 2.

Meanwhile, the disparity map has the same size as image data and disparity values corresponding to pixels constituting the image data are stored in pixel units. Namely, since disparity values corresponding to pixels constituting image data may be identified from the disparity map, 3D point cloud data may be generated even though all of left and right image data is not stored in the database 130.

A process to acquire 3D point cloud data from any one of left and right image data and the disparity map is as follows.

First, image data stored in the form of an image coordinate system is converted into image data of a space coordinate system using the following Equations (1) and (2).

$$x_1 = K_1^{-1} P_1^i(u,v) \quad (1)$$

$$x_2 = K_2^{-1} P_2^i(u-d,v) \quad (2)$$

$P_1(u,v)$ denotes a pixel coordinate of any one of left and right image data, $P_2(u-d,v)$ denotes a pixel coordinate, a disparity of $P_2(u-d,v)$ with $P_1(u,v)$ being d, and $x_1$ and $x_2$ denote values in mm converted into a space image coordinate system from an image coordinate system by multiplying image data by inverse matrices of camera interior parameters $K_1$, and $K_2$.

If left and right image data of the image coordinate system is converted into image data of the space coordinate system, 3D point cloud data X is generated using direct linear transform and is stored in the database 130.

Figure 3:
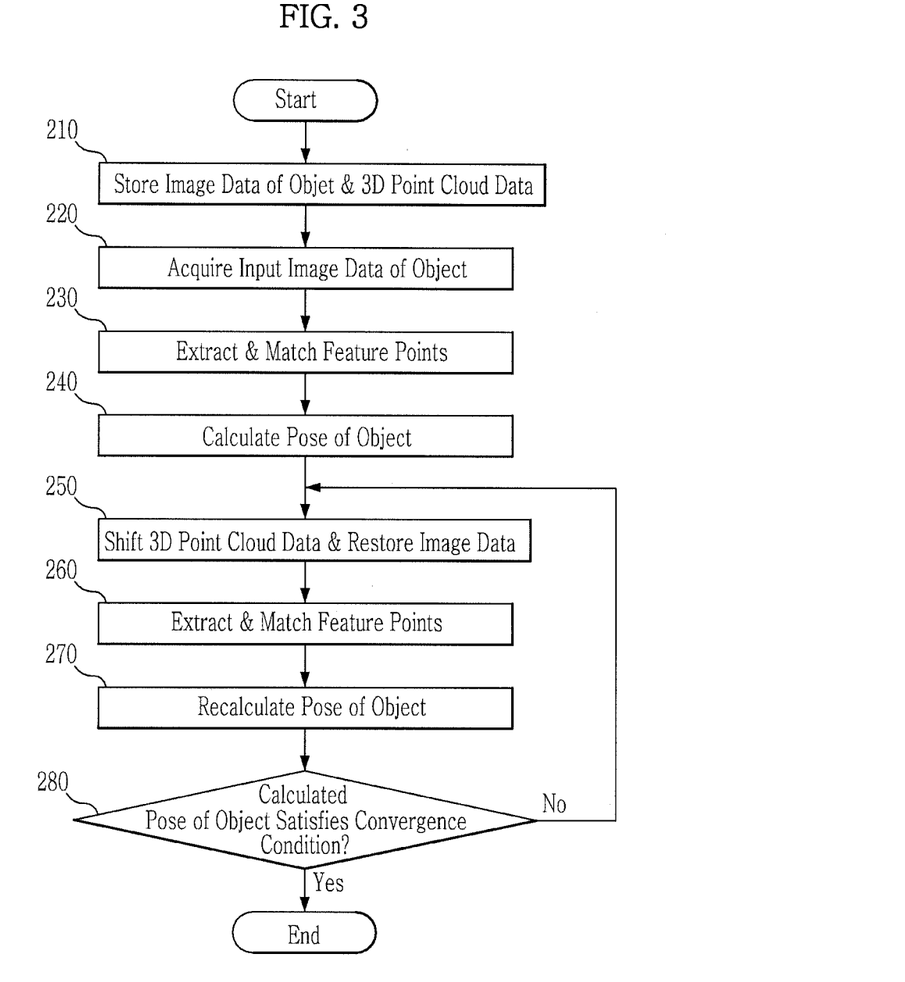
FIG. 3 is a flowchart illustrating an object pose recognition method according to another embodiment.

FIG. 3 is a flowchart illustrating an object pose recognition method according to another embodiment.

The database 130 stores image data of an object and 3D point cloud data in step 210. The image acquirer 110 acquires input image data of the object in step 220 to recognize a current state of the object.

The feature point processor 121 extracts feature points from the input image data acquired by the image acquirer 110 and matches the extracted feature points to each other in step 230. For the extraction and matching of the feature points, SURF is used.

Figure 4:
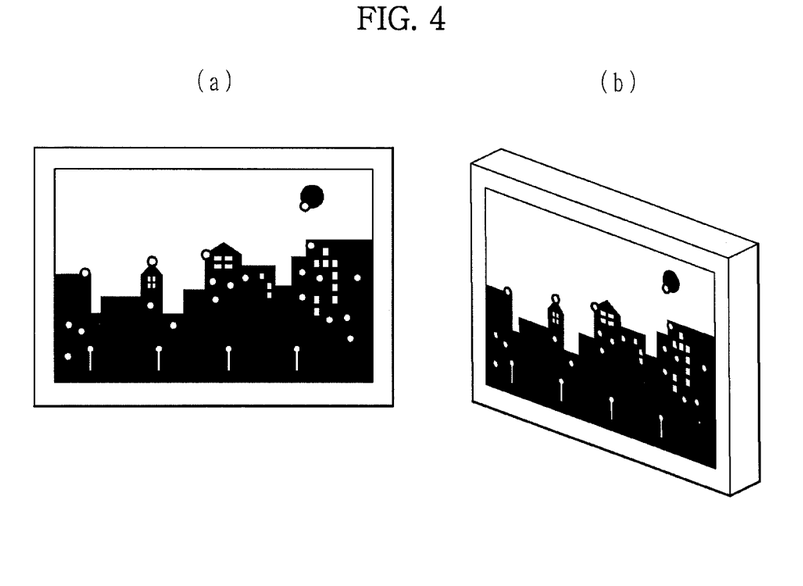
FIGS. 4A and 4B are diagrams illustrating results of the feature point extraction and matching process shown in FIG. 3.

FIGS. 4A and 4B are diagrams illustrating results of the feature point extraction and matching process (step 230). As the pose of an object in a current space is greatly varied based on a reference pose, matching points between the extracted feature points remarkably decrease.

If the feature points between the image data stored in the database 130 and the input image data are matched in step 230, the pose calculator 122 calculates the pose of an object in step 240. The pose of an object calculated in step 240 refers to information indicating to what extent an object recognized in a current space is varied from a reference pose of the image data stored in the database 130. The pose of the object includes a rotation vector which is rotation information of an object and a translation vector which is location information of an object. An object pose calculation process will be described later in detail with reference to FIG. 5.

If the pose of an object is calculated in step 240, the image data restorer 123 shifts initial 3D point cloud data stored in the database 130 by applying the rotation vector and the translation vector and restores image data by projecting the shifted 3D point cloud data in step 250. The image data which is restored based on the approximated object pose is similar to the pose of a currently recognized object compared to the existing image data stored in the database 130.

If the image data is restored in step 250, the feature point processor 121 extracts and matches feature points using the restored image data and the input image data in step 260. The pose calculator 122 recalculates the pose of an object in step 270.

Namely, the present embodiment repeats a process of shifting 3D point cloud data→restoring image data→extracting and matching feature points→calculating the pose of an object until the calculated object pose satisfies a convergence condition in step 280, by employing, as a basic principle, the calculation of the more accurate object pose using re-projected image data.

Meanwhile, whether the convergence condition is satisfied is determined by the distance between a point obtained by projecting the shifted 3D point cloud data and a point in a space coordinate system of input image data corresponding to the projected point. Equation (3) is the convergence condition.

$$E(\text{err}(x_1^i, x_2^i)) < 0.001 \text{ mm} \left( \text{where err}(x_1^i, x_2^i) = \sum_{i=0}^{N} |x_1^i - x_2^i| \right) \quad (3)$$

In Equation (3), $x_1^i$ denotes a point projected onto a normalized plane after shifting 3D point cloud data, $x_2^i$ denotes a point obtained by converting input image data corresponding to the projected point of the 3D point cloud data into data in a camera coordinate system, N denotes the number of corresponding points, and E denotes an average value.

That is, the convergence condition is satisfied when the average of the distance between a projected point of shifted 3D point cloud data and a point of input image data in a space coordinate system is within 0.001 mm.

Figure 5:
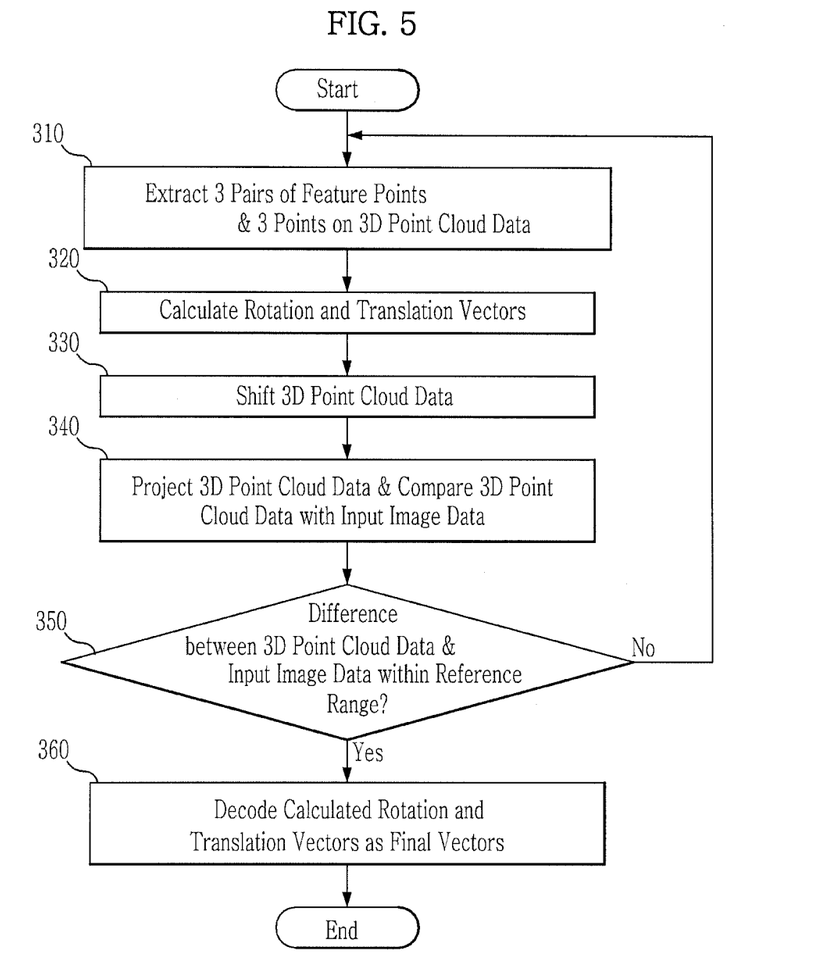
FIG. 5 is a flowchart illustrating the object pose calculation process shown in FIG. 3 in detail.

FIG. 5 is a flowchart illustrating the object pose calculation process shown in FIG. 3 in detail.

As described with reference to FIG. 3, the object pose calculation process follows the feature point extraction and matching process between image data stored in the database and the input image data.

The pose of an object is calculated using a three-point algorithm and RANSAC.

That is, the pose calculator 122 randomly extracts three pairs of points among matched pairs of feature points in step 310 and calculates rotation and location variation between two images using points on 3D point cloud data corresponding to the extracted feature points and points on the input image data in step 320.

Specifically, the pose calculator 122 randomly extracts three pairs of points from pairs of feature points and extracts three points on 3D point data corresponding to the extracted points in step 310. Further, the pose calculator 122 converts three points extracted from input image data in the unit of pixels into points of a space coordinate system in mm.

If the three points are extracted in step 310, a prescribed plane is formed by the extracted three points. The pose calculator 122 calculates a rotation vector and a translation vector by comparing the formed plane on the 3D point cloud data with a plane on the input image data in step 320.

If the rotation and translation vectors are calculated, the pose calculator 122 shifts ([RST] transforms) the 3D point cloud data by applying the rotation and translation vectors to points on the 3D point cloud data in step 330. The pose calculator 122 projects the shifted 3D point cloud data onto a normalized plane and compares the projected 3D point cloud data with the input image data in the space coordinate system in step 340.

Namely, the pose calculator 122 extracts three feature points, shifts all the points on 3D point cloud data using the calculated rotation and translation vectors, and compares the shifted 3D point cloud data with the input image data, thereby confirming the accuracy of the calculated rotation and translation vectors.

If a compared result of the projected 3D point cloud data with the input image data satisfies a predetermined condition in step 350, the pose calculator 122 decides the calculated rotation and translation vectors as final rotation and translation vectors in step 360. If not, the pose calculator 122 repeats processes of extracting three arbitrary pairs of feature points, calculating rotation and translation vectors, shifting the 3D point cloud data, and comparing the 3D point cloud data with the input image data in steps 310, 320, 330, and 340.

Meanwhile, the predetermined condition means that the Euclidean distance between a projected point of the [R|T] transformed 3D point cloud data and a corresponding point of the input image data is less than 0.002 mm, as indicated in Equation (4).

$$|x_1^i - x_2^i| \leq 0.002 \text{ mm} \qquad (4)$$

In Equation (4), $x_1^i$ denotes a point projected onto a normalized plane after shifting 3D point cloud data and $x_2^i$ denotes a point in a space coordinate system of input image data corresponding to the projected point of the 3D point cloud data.

Figure 6:
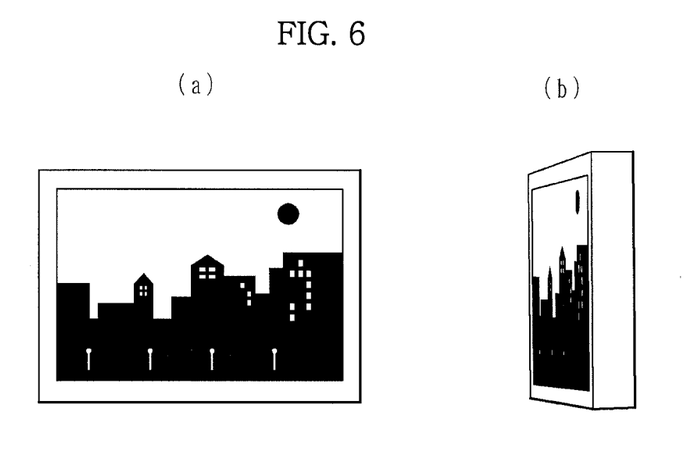
FIGS. 6A and 6B are diagrams illustrating variation of input image data according to rotation of an object.
Figure 7:
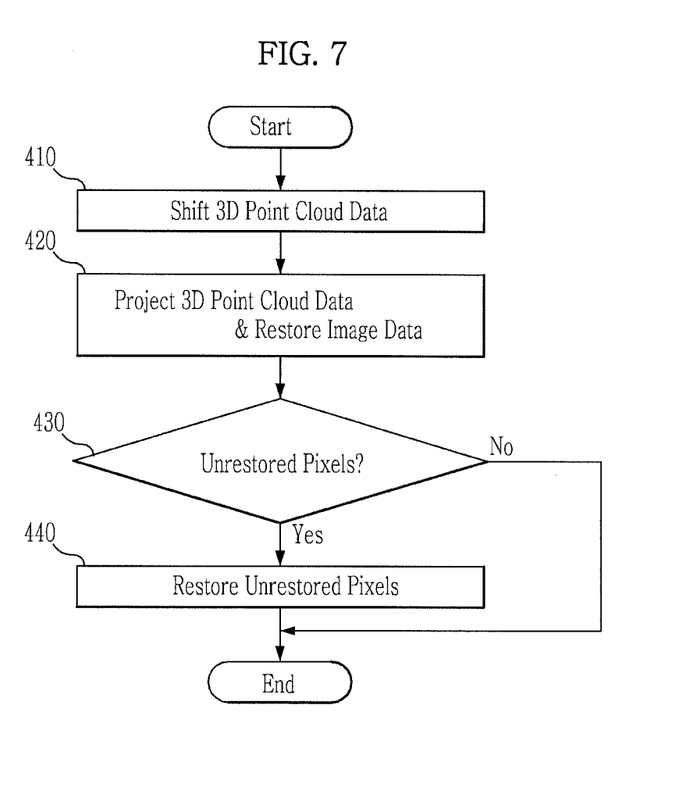
FIG. 7 is a flowchart illustrating the 3D point cloud data shifting and projection process shown in FIG. 3 in detail.
Figure 8:
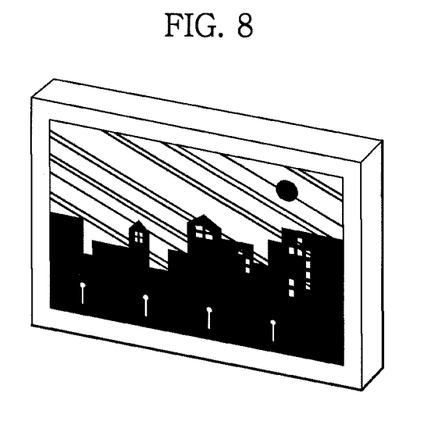
FIG. 8 is a diagram illustrating restored image data as a result of the 3D point cloud data shifting and projection process of FIG. 7.

FIGS. 6A and 6B are diagrams illustrating variation of input image data according to rotation of an object, FIG. 7 is a flowchart illustrating the 3D point cloud data shifting and projection process shown in FIG. 3 in detail, and FIG. 8 is a diagram illustrating restored image data as a result of the 3D point cloud data shifting and projection process of FIG. 7.

The rotation vector and translation vector approximated through the process of FIG. 5 may generate an error when a currently recognized object has a large amount of rotation. FIG. 6A shows an example of a reference pose of an object stored in the database and FIG. 6B shows an example of a currently recognized object acquired by the image acquirer, in which the amount of rotation is large compared with the reference pose of FIG. 6A.

Specifically, the horizontal size of the object of FIG. 6B is about 50% of that of FIG. 6A, and a 3D range of the object of FIG. 6B per pixel is about twice that of FIG. 6A. Accordingly, the approximated rotation and translation vectors may have a substantial error.

To overcome such a problem, the present embodiment proposes an algorithm to recalculate the pose of an object by image data restored by shifting previously stored 3D point cloud data using rotation and translation vectors approximated by image data stored in the database and input image data and projecting the shifted 3D point cloud data on a normalized plane. The algorithm to recalculate the pose of an object is described in detail with reference to FIG. 7.

Previously stored 3D point cloud data is shifted using approximated rotation and translation vectors in step 410. The shift of the 3D point cloud data conforms to Equation (5), $$X2i = AX1i \left( \text{where, } A = \begin{bmatrix} R_{3*3} & T_{3*1} \\ 0 \quad 0 \quad 0 & 1 \end{bmatrix} \right) \qquad (5)$$

In Equation (5), $X_1^i$ denotes a set of points on current 3D point cloud data, $X_2^i$ denotes a set of points on shifted 3D point cloud data using calculated rotation and translation vectors, and A denotes an [R|T] matrix where R is a rotation vector and T is a translation vector. Namely, $X_2^i$ is calculated as [R|T] transform multiplied by A.

If the 3D point cloud data is shifted in step 410, the shifted point cloud data is projected onto a normalized plane and image data is restored in step 420. The normalized plane is a plane in which a distance from a principal point of a camera is 1. The projection of the 3D point cloud data and the restoration of the image data conform to Equations (6) and (7).

$$\begin{bmatrix} x_i \\ y_i \\ z_i \end{bmatrix} = [k] \begin{bmatrix} 1 & 0 & 0 & 0 \\ 0 & 1 & 0 & 0 \\ 0 & 0 & 1 & 0 \end{bmatrix} \begin{bmatrix} X_i \\ Y_i \\ Z_i \\ 1 \end{bmatrix} \qquad (6)$$

$$P_i = \begin{bmatrix} u_i \\ v_i \end{bmatrix} = \begin{bmatrix} \dfrac{x_i}{z_i} \\ \dfrac{y_i}{z_i} \end{bmatrix} \qquad (7)$$

Through Equation (6), 3D point cloud data is projected onto a normalized plane and a camera parameter is multiplied by the projected data to convert the 3D point cloud data into data of an image coordinate system. Equation (7) is an equation obtained by converting Equation (6) into image data. Accordingly, image data is restored by projecting the shifted 3D point cloud data in step 420 as the result of Equation (6) and Equation (7).

FIG. 8 shows an example of image data restored by projecting the 3D point cloud data. It may be appreciated that a cracking phenomenon of an image occurs due to pixels which are not restored. If feature points are extracted and matched from image data in which a cracking phenomenon occurs, a correct matching result is not obtained because the recognition of an object based on feature points is vectorization of variations of neighboring brightness values centering on any one point. Therefore, a process to restore the unrestored pixels is needed and this process is described in detail.

Referring back to FIG. 7, the image data restorer 123 determines whether there are unrestored pixels in the restored image data based on a pixel of reference brightness in step 430.

In this embodiment, the reference bright is '0'. When pixels correspond to background except for an object or when points of 3D point cloud data constituting an object are not restored from image data, a brightness value of pixels is 1. In this embodiment, the latter case, that is, pixels which are not restored from image data due to non-projection of 3D points on an object are restored.

The image data restorer 123 determines whether a pixel is an unrestored pixel by Equation (8).

$$\text{Boundary Score}(u, v) = \sum_{i=-1}^{1} \sum_{j=-1}^{1} I(u+j, y+1) \qquad (8)$$

-continued where $$I(u, v) = \begin{cases} 1, & \text{intensity } (u, v) > 0 \\ 0, & \text{otherwise} \end{cases}$$

In Equation (8), Boundary_Score(u,v) denotes the number of pixels having a non-zero brightness value among 9 pixels including an arbitrary pixel having a brightness value of '0' and 8 pixels surrounding the arbitrary pixel.

Namely, the image data restorer 123 determines whether a pixel has reference brightness and checks the brightness values of 8 pixels adjacent to the pixel having the reference brightness. The image data restorer 123 calculates the number of pixels having a non-zero brightness value among 9 pixels including the pixel having the reference brightness. If the calculated number is greater than 5, the image data restorer 123 determines that the pixel having the reference brightness is an unrestored pixel to which a 3D point is not projected.

If an unrestored pixel is present in the restored image data in step 430, the image data restorer 123 restores the unrestored pixel using 3D point cloud data of the image data in step 440. The image data restorer 123 restores the unrestored pixel by extracting a point of 3D point cloud data nearest the unrestored pixel. The restoration of the unrestored pixel conforms to Equation (9) and Equation (10).

$$x_0 = K_1^{-1} P_0(u,v)$$

$$x_i = \begin{bmatrix} 1 & 0 & 0 & 0 \\ 0 & 1 & 0 & 0 \\ 0 & 0 & 1 & 0 \end{bmatrix} \begin{bmatrix} X_i \\ Y_i \\ Z_i \\ 1 \end{bmatrix} \quad (9)$$

In Equation (9), $x_0$ denotes a coordinate obtained by converting an unrestored pixel $P_0(u,v)$ into a space coordinate system and $x_i$ denotes a coordinate obtained by projecting 3D point cloud data onto a normalized plane.

$$l(P_0) = l(x_i, y_i)$$

$$x_j = (x_i, y_i) = \text{argmin} |nx_0 - x_j| \quad (10)$$

Referring to Equation (10), brightness $l(P_0)$ of an unrestored pixel is set to a brightness value $l(x_i, y_i)$ of a point $x_1$ of 3D point cloud data nearest a straight line $nx_0$ between a principal point of a camera and an unrestored pixel $x_0$ converted into a camera coordinate system.

Thus image data generated by restoring all unrestored pixels is used to more accurately obtain rotation and translation vectors through matching of feature points with input image data and calculation of the pose of an object.

As is apparent from the above description, invariance performance may be improved relative to a conventional method and stable recognition performance may be obtained. Accordingly, intelligent robots and robot services may be provided to households in which various objects are present. Accordingly, a robot can be controlled based on a pose calculated in embodiments described herein. Furthermore, the object recognition apparatus and method may be used for security monitoring using a stereoscopic camera in addition to robots.

Embodiments can be implemented in computing hardware and/or software, such as (in a non-limiting example) any computer that can store, retrieve, process and/or output data and/or communicate with other computers. For example, the controller 120 in FIG. 1 may include a computer to perform calculations and/or operations described herein. The results produced can be displayed on a display of the computing hardware. A program/software implementing the embodiments may be recorded on non-transitory computer-readable media comprising computer-readable recording media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. An object pose recognition method, comprising:
    acquiring first image data of an object to be recognized and 3-dimensional (3D) point cloud data of the first image data, and storing the first image data and the 3D point cloud data in a database;
    after said acquiring,
        receiving input image data of the object photographed by a camera,
        extracting, by a computer, feature points from the stored first image data and the input image data,
        matching, by a computer, the stored 3D point cloud data and the input image data based on the extracted feature points,
        calculating a pose of the photographed object based on said matching, the calculated pose including a rotation vector which is rotation information of the object and a translation vector which is location information of the object,
        shifting, by a computer, the 3D point cloud data based on the calculated pose by applying the rotation vector and the translation vector to the 3D point cloud data,
        projecting the shifted 3D point cloud data onto a normalized plane, to thereby provide shifted, normalized 3D point cloud data,
        restoring second image data based on the shifted, normalized 3D point cloud data, and
        re-calculating the pose using the restored second image data and the input image data.

2. The object pose recognition method according to claim 1, wherein the re-calculation of the pose is repeated until the calculated pose satisfies a preset convergence condition.

3. The object pose recognition method according to claim 1, wherein the re-calculation of the pose includes:
    extracting feature points from the restored second image data and the input image data; and
    matching the shifted, normalized 3D point cloud data and the input image data based on the extracted feature points and re-calculating the pose.

4. The object pose recognition method according to claim 1, further comprising;
    determining whether an unrestored pixel is present in the second image data; and
    if the unrestored pixel is present, restoring the unrestored pixel using the shifted, normalized 3D point cloud data.

5. The object pose recognition method according to claim 4, wherein the determination includes:

if a pixel has reference brightness, checking brightness of a plurality of pixels adjacent to the pixel; and if the number of pixels having brightness exceeding the reference brightness is above a preset number, determining that the pixel is an unrestored pixel.

6. The object pose recognition method according to claim 4, wherein the unrestored pixel is restored by setting brightness of the unrestored pixel to a brightness value of a 3D point nearest the unrestored pixel from 3D point cloud data of the second image data.

7. The object pose recognition method according to claim 6, wherein the 3D point nearest the unrestored pixel is a point nearest a straight line between a principal point of the camera and the unrestored pixel.

8. The object pose recognition method according to claim 1, further comprising:

controlling a robot based on the recalculated pose.

9. An object pose recognition apparatus comprising:

a database to acquire first image data of an object to be recognized and 3-dimensional (3D) point cloud data of the first image data, and store the first image data and the 3D point cloud data;

a receiver to, after the first image data and the 3D point cloud data are stored in the database, receive input image data of the object photographed by a camera;

a feature point processor to extract feature points from the stored first image data and the input image data and match the extracted feature points;

a pose calculator to calculate a pose of the photographed object based on the feature points matched through the feature point processor, the calculated pose including a rotation vector which is rotation information of the object and a translation vector which is location information of the object; and an image data restorer to shift the stored 3D point cloud data based on the calculated pose by applying the rotation vector and the translation vector to the 3D point cloud data, to project the shifted 3D point cloud data onto a normalized plane, to thereby provide shifted, normalized 3D point cloud data, and to restore second image data based on the shifted, normalized 3D point cloud data, wherein the pose calculator recalculates the pose using the second image data restored by the image data restorer and the input image data.

10. The object pose recognition apparatus according to claim 9, wherein the image data restorer determines whether the pose of calculated by the pose calculator satisfies a preset convergence condition, and the pose calculator repeats the re-calculation of the pose until the pose calculated by the pose calculator satisfies the convergence condition.

11. The object pose recognition apparatus according to claim 9, wherein the feature point processor extracts feature points from the second image data and the input image data and matches the extracted feature points.

12. The object pose recognition apparatus according to claim 9, wherein the image data restorer determines whether an unrestored pixel is present in the second image data, and if the unrestored pixel is present, restores the unrestored pixel using the shifted, normalized 3D point cloud data.

13. The object pose recognition apparatus according to claim 12, wherein, if a pixel has reference brightness, the image data restorer checks brightness of a plurality of pixels adjacent to the pixel, and determines that the unrestored pixel is present if the number of pixels having brightness exceeding the reference brightness is above a preset number.

14. The object pose recognition apparatus according to claim 12, wherein the image data restorer extracts a point nearest the unrestored pixel from 3D point cloud data of the second image data if the unrestored pixel is present, and restores the unrestored pixel by setting brightness of the unrestored pixel to a brightness value of the extracted 3D point.

15. The object pose recognition apparatus according to claim 14, wherein the image data restorer extracts a 3D point nearest a straight line between a principal point of the camera and the unrestored pixel as the point nearest the unrestored pixel.

* * * * *